UNITED STATES PATENT OFFICE.

LEOPOLD SCHEPP, OF NEW YORK, N. Y.

IMPROVEMENT IN DESSERT COMPOSITIONS.

Specification forming part of Letters Patent No. 179,963, dated July 18, 1876; application filed May 9, 1876.

*To all whom it may concern:*

Be it known that I, LEOPOLD SCHEPP, of the city, county, and State of New York, have invented a new and Improved Preserve Composition for Cocoa-Nut Drops, &c., of which the following is a specification:

The object of my invention is to prepare an article of food from cocoa-nuts, to be used as a dessert. It relates more specially to such a composition for cocoa-nut drops by which they will preserve the flavor and richness of the nut for an indefinite time without being liable to become rancid and stale, as the present cocoa-nut preparations.

The invention consists of the mixture of purified or desiccated cocoa-nut and cocoa-nut oil, with the substances commonly used in the manufacture of cocoa-nut articles.

In preparing my preserve composition for cocoa-nut articles I take forty (40) parts of purified or desiccated cocoa-nut and add to the same ten (10) parts of purified cocoa-nut oil, six (6) parts of milk, forty-eight (48) parts of sugar, and one-half (½) part of ammonia, and mix the same thoroughly to a thin batter, adding then forty (40) parts of flour and ten (10) parts of beaten eggs, by which a soft dough is obtained that is then rolled out, cut, and baked in a quick oven.

The employment of the desiccated cocoa-nut and the purified oil of cocoa-nut admits the production of an article that is not perishable as the common cocoa-nut crackers and other preparations, but preserves, on the contrary, all the flavor and rich taste of the cocoa-nut for any length of time.

Having thus described my invention, what I claim as new, and desire to secure by Letters Patent, is—

A preserve composition for cocoa-nut articles, composed, mainly, of purified or desiccated cocoa-nut and purified cocoa-nut oil, substantially as and for the purpose specified.

LEOPOLD SCHEPP.

Witnesses:
ALFRED W. LOWERRE,
N. A. CLOSSON.